J. T. STAUFFER.
SULKY RAKE ATTACHMENT.
APPLICATION FILED JUNE 23, 1909.
964,577.
Patented July 19, 1910.
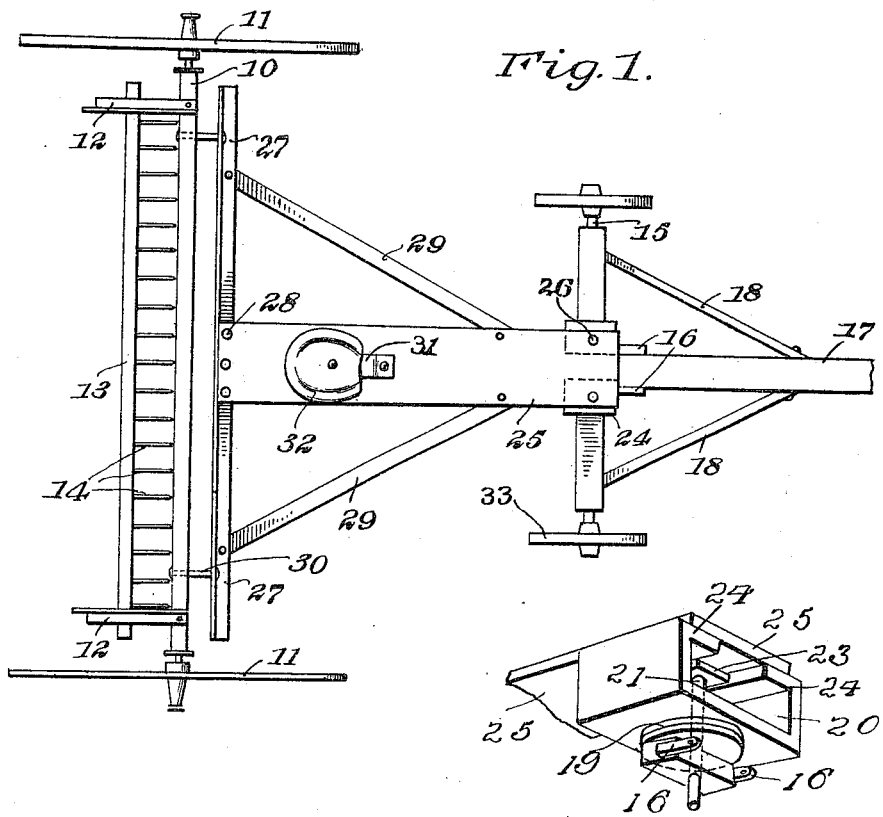
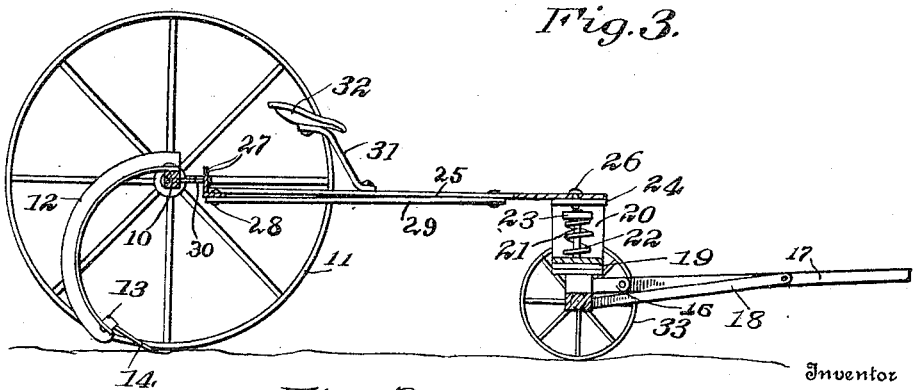
Witnesses
W. N. Woodson,
Juana M. Fallin,
Inventor
J. T. Stauffer,
By
A. A. Macy, Attorneys.
THE NORRIS PETERS CO., WASHINGTON, D. C.

UNITED STATES PATENT OFFICE.

JOHN T. STAUFFER, OF YATES CENTER, KANSAS.

SULKY-RAKE ATTACHMENT.

964,577. Specification of Letters Patent. Patented July 19, 1910.

Application filed June 23, 1909. Serial No. 503,865.

*To all whom it may concern:*

Be it known that I, JOHN T. STAUFFER, a citizen of the United States, residing at Yates Center, in the county of Woodson and State of Kansas, have invented certain new and useful Improvements in Sulky-Rake Attachments, of which the following is a specification.

This invention relates to rakes and has particular reference to an attachment for a sulky rake.

An object of this invention is to obviate the side thrust of the tongue upon the draft animal or animals during the operation of the rake incident to the engagement of the teeth at one side of the rake with obstacles tending to rotate the implement.

The invention has for another object the provision of means which may be readily applied to sulky rakes of common formation, or may be applied to the implements of any nature wherein it is desired to add an independent tongue attachment.

The invention further aims at the construction of a device of this nature which is simple and durable so as to produce a device of this nature which will withstand all the usages to which the same is subjected incident to its use.

For a full understanding of the invention reference is to be had to the following description and accompanying drawings, in which:—

Figure 1 is a top plan view of the attachment as applied to a sulky rake, and Fig. 2 is a longitudinal vertical section through the same.

Corresponding and like parts are referred to in the following description and indicated in all the views of the drawing by the same reference characters.

Referring to the drawing the numeral 10 designates an axle to which the wheels 11 are applied in the usual manner and upon the opposite extremities of the same. Depending from the opposite ends of the axle 10 inwardly of the wheels 11 are arcuate supports 12 which carry upon their lower extremities a transverse beam 13 which carries a plurality of tines 14 which form the rake.

The improved attachment comprises a main axle 15 which is provided with ears 16 which are forwardly extended in parallel from the same and engage the rear extremity of a tongue 17 which is projected outwardly from the same. The tongue 17 is braced in position by the employment of the tongue-hounds 18 disposed between an intermediate point upon the tongue 17 at the opposite ends of the main axle 15. Centrally disposed upon the upper face of the axle 15 is a circular bearing member 19 which serves as a support for a U-shaped brace 20 which is intermediately and rotatably engaged upon the circular member 19. The brace 20 is centrally apertured for the reception of a king-bolt 21 which is vertically disposed through the axle 15 and brace 20 and is provided with a helical spring 22 which is disposed about the upper end of the king-bolt 21 and engaged between the upper face of the U-brace 20 and a clamping nut 23. The spring 22 is employed for the purpose of regulating the tensional engagement between the U-shaped brace 20 and the circular member 19. The upper extremities of the U-brace 20 are turned inwardly to lie in a horizontal position as is disclosed at 24 upon which is engaged the forward extremity of a reach 25 extended laterally therefrom. The horizontal members 24 are secured to the reach by means of bolts or rivets 26 which engage through the members 24 and retain the brace 20 from rotation relative to the reach 25. Across the rear extremity of the reach 25 is disposed a beam of angle iron 27 which is so positioned that one flange of the same extends vertically and is retained upon the extremity of the reach 25 by the employment of rivets or bolts 28. The beam 27 is braced in position by means of the rear hounds 29 extended from the ends of the beam 27 to an intermediate point upon the reach 25. The attachment is secured to the rake by means of rods 30 which are engaged through the upstanding flange of the beam 27 and extended rearwardly therefrom for engagement through the axle 10. Intermediately mounted upon the reach 25 is a seat-post 31 upon the upper end of which is positioned a seat 32. The axle 15 is supported by the employment of wheels 33 which are mounted upon the opposite ends of the axle 15 and are preferably of a reduced diameter to that of the wheels 11 of the rake.

It is readily seen that when the implement is drawn over the field should any lateral strain be exerted upon the rake the same will be transmitted to the reach 25 and the side thrust will be taken up by the wheels 33 through the U-brace 20 and king-bolt 21. By this arrangement an even draft will be maintained and all side thrust upon the draft animals will be eliminated. The attachment may be applied to sulky rakes of common formation by simply removing the tongue from the same and securing the rods 30 to the main axle of the frame thereof.

Having thus described the invention what is claimed as new is:—

1. In combination with a sulky rake of an axle, wheels mounted on said axle, a brace pivotally mounted centrally of said axle and extended upwardly therefrom, a tongue outwardly extended from said axle for the purpose of drawing the same, a reach rearwardly extended from said brace, a beam disposed across the rear end of said reach and connected to said rake and hounds disposed between said reach and said beam for the purpose of supporting the same.

2. In combination with an axle, wheels mounted on said axle and a frame carried by said axle of a main axle, wheels disposed on said main axle, a tongue forwardly extended from said main axle, a U-shaped brace upwardly extended from said main axle, a reach secured upon the upper ends of said brace and extended backwardly therefrom, a beam transversely disposed across said reach and connected to said first axle, and hounds disposed between said beam and said reach to rigidly support said beam in position.

3. An attachment for a sulky rake comprising an axle, wheels disposed upon the opposite ends of said axle, a U-shaped brace engaged upon the upper face centrally of said axle, a circular member formed on said axle for engagement beneath said brace, a king-bolt extended through said axle and said brace, a helical spring engaged about the upper end of said bolt and impinged at its lower end against said brace, an adjusting nut positioned upon the upper end of said bolt for engagement with said spring to regulate the tension thereof, a tongue forwardly extended from said axle to operate the same, the upper extremities of said brace being turned inwardly in a substantially horizontal plane, a reach engaged with the horizontal portions of said brace and extended backwardly therefrom, a beam transversely disposed upon the rear extremity of said reach, and hounds positioned between said reach and the outer ends of said beam.

4. An attachment for a sulky rake including an axle, wheels carried by said axle, a bearing member located centrally upon said axle, a U-shaped brace mounted upon said bearing member, a reach connected to the upper ends of said brace and extended rearwardly therefrom, and a transverse beam disposed upon the rear end of said reach.

In testimony whereof I affix my signature in presence of two witnesses.

JOHN T. STAUFFER. [L. S.]

Witnesses:
CHAS. E. SENIE,
W. C. STANGE.